United States Patent [19]

Smith et al.

[11] Patent Number: 4,910,670
[45] Date of Patent: Mar. 20, 1990

[54] SOUND GENERATION AND DISK SPEED CONTROL APPARATUS FOR USE WITH COMPUTER SYSTEMS

[75] Inventors: Burrell C. Smith; Andrew J. Hertzfeld, both of Palo Alto, Calif.

[73] Assignee: Apple Computer, Inc., Cupertino, Calif.

[21] Appl. No.: 51,938

[22] Filed: May 19, 1987

Related U.S. Application Data

[63] Continuation of Ser. No. 573,132, Jan. 20, 1984, abandoned.

[51] Int. Cl.⁴ ............... G06F 3/153; G06F 3/16; G06F 12/00
[52] U.S. Cl. ............... 364/200; 360/73.08; 358/903; 273/DIG. 28; 84/1.01
[58] Field of Search ............... 360/51, 65, 72.2, 73, 360/78, 53, 97, 73.03, 73.06, 73.07, 73.08; 364/200, 700, 410; 318/318, 341; 358/32, 86, 143, 145, 147, 903; 381/32; 273/DIG. 28; 340/384 E; 84/1.01, 3; 341/152

[56] References Cited

U.S. PATENT DOCUMENTS

| 3,987,419 | 10/1976 | Morrill et al. | 340/172.5 |
|---|---|---|---|
| 4,148,485 | 4/1979 | Rains | 273/86 B |
| 4,272,649 | 6/1981 | Pfeiffer | 179/1 SM |
| 4,296,446 | 10/1981 | Zorbalas | 360/73 |
| 4,296,930 | 10/1981 | Frederiksen | 273/313 |
| 4,357,635 | 11/1982 | Hasegawa | 360/73.03 X |
| 4,367,876 | 1/1983 | Kotoyori | 273/121 A |
| 4,467,319 | 8/1984 | Uchikoshi | 341/152 |
| 4,475,228 | 10/1984 | Vickers | 381/51 |
| 4,481,852 | 11/1984 | Makuta et al. | 340/384 E X |
| 4,482,974 | 11/1984 | Kovalick | 364/718 X |
| 4,485,337 | 11/1984 | Sandusky | 360/73.03 X |
| 4,490,810 | 12/1984 | Hon | 364/900 |
| 4,492,992 | 1/1985 | Rooney et al. | 360/73.03 |
| 4,514,771 | 4/1985 | Stark et al. | 360/73 |
| 4,530,018 | 7/1985 | Hoshino et al. | 360/73 |
| 4,530,499 | 7/1985 | Breslow et al. | 273/1 GC |
| 4,536,743 | 8/1985 | Uchikoshi | 341/152 |
| 4,538,176 | 8/1985 | Nakajima et al. | 358/86 |
| 4,558,383 | 12/1985 | Johnson | 360/77 |
| 4,569,019 | 2/1986 | Diorio et al. | 364/410 |
| 4,569,026 | 2/1986 | Best | 364/521 |
| 4,573,039 | 2/1986 | Suzuki et al. | 341/152 |
| 4,577,240 | 3/1986 | Hedberg et al. | 360/22 |
| 4,582,324 | 4/1986 | Koza et al. | 273/138 A |
| 4,603,412 | 7/1986 | Yamazaki | 360/73.03 X |

OTHER PUBLICATIONS

Conrad Boisvert, "Simplify CRT-system design with transparent addressing—it comes on a controller chip", Electronic Design, Aug. 2, 1979, pp. 90–93.

Primary Examiner—David L. Clark
Attorney, Agent, or Firm—Blakely, Sokoloff, Taylor & Zafman

[57] ABSTRACT

An apparatus for generating an analog audio signal and a speed control signal for a disk drive for use with a microprocessor having a RAM which provides a video signal for a raster scanned display. Direct addressing to the RAM is used during horizontal blanking periods to allow data to be read from the RAM and used to generate the audio and speed control signals. The data is updated during the blanking periods. The speed control signal to the disk controller varies as a function of track (radius).

11 Claims, 6 Drawing Sheets

_Fig. 5_

_Fig. 6_

END OF PULSE

SOUND GENERATION AND DISK SPEED CONTROL APPARATUS FOR USE WITH COMPUTER SYSTEMS

This is a continuation of application Ser. No. 573,132 filed Jan. 20, 1984 now abandoned.

BACKGROUND OF THE INVENTION

1. Field of the Invention

The invention relates to a sound generation apparatus, particularly one employed with a computer system which includes a raster scanned display and a disk speed control apparatus.

2. Prior Art

There are countless well-known techniques for generating audio signals from digital signals. These include the more straightforward approaches where digital signals are used to provide an instantaneous amplitude of the audio signal, to the more complex vocoder techniques where transfer functions representative of voice are used. As will be seen, the present invention converts a digital signal to an analog (audio) signal, although this conversion is only one aspect of the present invention.

Most often, computer systems, particularly smaller systems (e.g., personal computers) employ raster scanned displays. The computer generates the video information and stores it in a random-access memory (RAM). Counters synchronize with the horizontal and vertical synchronization signals address the memory to provide display synchronized data signals from the memory. These signals are converted to a video signal, for instance, through a shift register. In some cases, the memory is "bit mapped" and the output from the memory is directly used to generate the video signal. In other cases, the output from the memory addresses a character generation which is scanned to provide video signals.

A considerable amount of data from RAM is required to generate a video display, particularly in a dynamic, graphics (non-text) mode. In the personal computer field, or small business computer field, where microprocessors are used along with dynamic RAMs, the generation of a video display consumes a relatively large amount of processor and memory time. It is thus difficult to provide an audio signal, particularly a complex audio signal in a display mode.

As will be seen, the present invention provides an apparatus for generating audio signals in conjunction with a microprocessor and RAM simultaneously with the generation of video signals. The audio signals are generated without disrupting the video display or computer operation, and importantly, with a minimum of hardware and processor time.

Typically, in floppy disk drives, some mechanism is employed to drive the floppy disk motor at a constant speed. When the floppy disk drive is manufactured, certain calibration steps are often used to assure that the floppy disk drive runs at a predetermined rate of rotation. This requires, in addition to the calibration steps, relatively costly speed control mechanisms. As will be seen, in the present invention, the computer is used to sense the rate of rotation of the disk drive and then provides a control signal to adjust the disk drive's rate of rotation. This eliminates the prior art calibration and also the prior art's speed control mechanism.

It has been suggested in the prior art that better utilization of floppy disks or other disks can be obtained if uniform flux density transitions are used. This requires that the rate of rotation of the disk be made a function of the radius of the particular track being accessed. The present invention provides such a feature.

SUMMARY OF THE INVENTION

The present invention provides an apparatus for use with a computer system which includes a microprocessor and random-access memory (RAM), particularly where a raster scanned display is used with the computer system. Addressing means are used for directly accessing predetermined locations in the RAM, especially during the horizontal blanking period. The addressing means also permits data in these same locations to be updated during the blanking periods. The data stored in these locations is converted from its digital form to an analog signal. A pulse is initiated when the data from memory is loaded into a counter. The pulse is ended when the counter reaches an overflow. The resultant pulses are integrated to provide the audio signal.

The processor generates the data signals for the RAM for a single tone by adding a predetermined number to a stored number. The most significant bits of this sum identify a location in a look-up table and the resultant (digital) data signal is then stored in RAM. The predetermined number is repeatedly added to the stored number to provide each of the data signals for the RAM. For more complex tones, a number of predetermined numbers and stored numbers are used along with a plurality of look-up tables.

The present invention also provides an apparatus for controlling the rate of rotation of a disk. The addressing means used in conjunction with the sound generation apparatus are used as part of the disk control apparatus.

DETAILED DESCRIPTION OF THE INVENTION

An apparatus for generating audio signals in conjunction with a computer system particularly one which generates signals for a raster scanned display and for generating a motor speed control signal is described. In the following description numerous specific details are set forth such as specific frequencies, number of lines, commercial part numbers, etc., to provide a thorough understanding of the present invention. However, it will be obvious to one skilled in the art that the present invention may be practiced without these specific details. In other instances, well-known circuits have been shown in block diagram form in order not to unnecessarily obscure the present invention.

DEFINITION

In the following description, the term "audio or sound data signal" or "sound data" is used to identify a digital signal which is converted to an analog (audio) signal. The term motor speed control refers to the control of rate of rotation of a motor or disk driven by the motor.

GENERAL ARCHITECTURE

Figure 1:
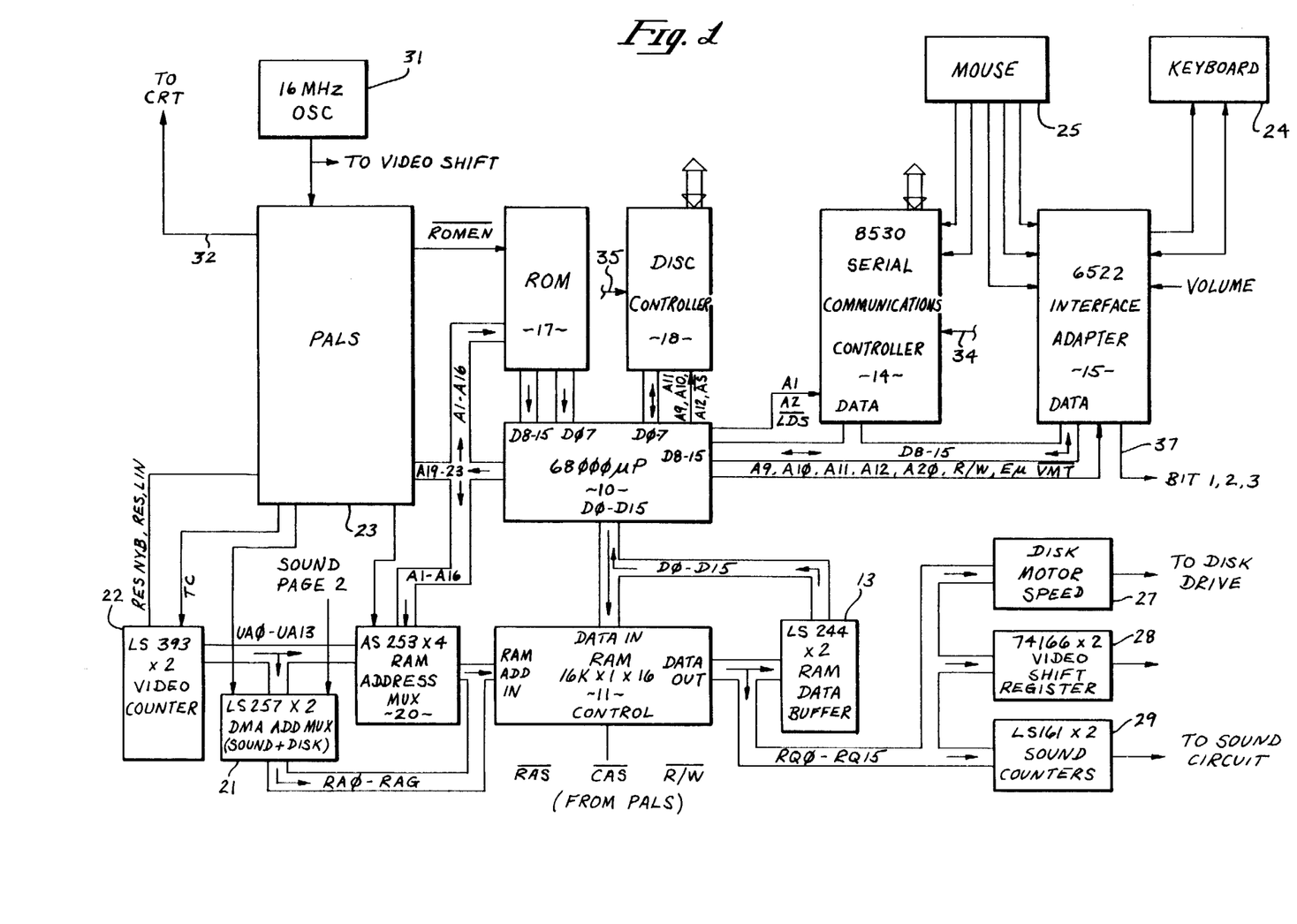
FIG. 1 is a block diagram of the computer system and illustrates the address multiplexing used in conjunction with the present invention.

The present invention is currently realized as part of a computer system (personal computer or small business computer) employing a Part No. 68000 microprocessor. The address lines and data lines for this microprocessor 10 are shown in FIG. 1. The other well-known lines coupled to this processor are not shown in FIG. 1. The microprocessor 10 is coupled to a random-access memory (RAM) 11 comprising sixteen 64K dynamic memory "chips". The data lines 0–15 interconnect the microprocessor 10 and RAM 11 to permit data to flow from the processor into the RAM. The data from the RAM is coupled through the RAM data buffer 13 into the processor; also data is coupled from the RAM 11 to disk motor speed controller 27, video shift register 28 and sound counters 29. The latter counters will be described in detail in conjunction with FIG. 3. Data is also received by the microprocessor 10 from the read-only memory (ROM) 17 when the ROM is enabled (ROMEN/). Similarly, data is transferred to and from the disk controller 18 when the disk controller 18 is enabled by a signal on line 35. This signal, as is the ROMEN/ signal is generated within the PALS 23. Data is likewise coupled to and from the microprocessor 10 to a serial communications controller 14 and an interface adapter 15 (Commercial Part Nos. 8530 and 6522, respectively).

Addresses from the microprocessor 10 are coupled to the ROM 17, PALS 23 and RAM address multiplexer 20. Some of the address signals, as indicated, are also coupled to the disk controller 18, serial communications controller 14 and interface adapter 15.

The RAM address multiplexer 20 permits the RAM to be addressed either by the microprocessor 10 or directly by the count stored in the video counter 22. During the time when the video signal is "painting" the screen, the multiplexer 20 selects the video counter 22, thus allowing the counter to directly address the RAM 11. (A signal from PALS 23 controls this selection.) During other times, the RAM address multiplexer 20 permits the microprocessor 10 to directly access the RAM 11. The second address multiplexer 21 as is multiplexer 20 is controlled by a signal from the PALS 23. During the last portion of the horizontal blanking signal, as will be described in conjunction with FIG. 2, multiplexer 21 selects the highest order 7 bits from the counter 22 and forces the memory to this address. This requires that the sound and disk speed data be stored in dedicated and consecutive locations of the RAM and permits easier access by the microprocessor when this data is updated. A latch, not shown, provides an additional bit input to the address lines of the multiplexer 21 to cause direct access to a second page of sound data in RAM 11.

The video counter 22 which consists of two Part Nos. 74LS393 provides a digital video count which corresponds to the beam's position on a raster scanned display and additional counts for the horizontal and vertical restore (blanking) periods. The timing signals which operate this counter along with the reset signals are generated by the PALS 23.

The PALS 23 consist of three program array logic chips. They receive the crystal controlled 16 mHz oscillator signal from oscillator 31. The PALS 23 generate from this signal the standard memory signals such as RAS/, CAS/, and the well-known timing signals used by the microprocessor. They also provide the horizontal synchronization signal (HSYNC/) and the vertical synchronization signal (VSYNC/). These signals are coupled to the display on lines 32. Other clocking signals used throughout the memory, such as the 8 MHz clocking signal used by the counters of FIG. 3 and the clocking signal used by the disk motor speed controller are generated within the PALS 23.

Two 32K×8 ROMS 17 are employed in the presently preferred embodiment. They provide storage for diagnostics, initialization and other functions not relevant to the present invention.

The disk controller 18 provides an interface to a floppy disk drive. The controller is described in more detail in copending application Ser. No. 573,067, filed Jan. 24, 1984, entitled Integrated Floppy Disk Drive Controller, and assigned to the assignee of the present invention.

The adapter communicates with the keyboard 24. A mouse 25 provides cursor input and switching information to both the controller 14 and adapter 15. A volume control knob is drawn on the graphics screen and is controlled by the mouse to provide three bits of binary data on lines 37. As will be described in conjunction with FIG. 6, these three bits are used for a static volume control for the audio signal.

VIDEO TIMING

In the presently preferred embodiment, horizontal scanning occurs at a rate of 22,256.84398 Hz. Vertical scanning occurs at a rate of 60 Hz. Each frame consists of 370 scan lines and there are 704 pixels, or dots, per horizontal scan. This corresponds to 44 sixteen bit words from the RAM 11. Thus, the main clock rate from oscillator 31 shown as 16 mHz is more accurately 15.6672 mHz.

Figure 2:
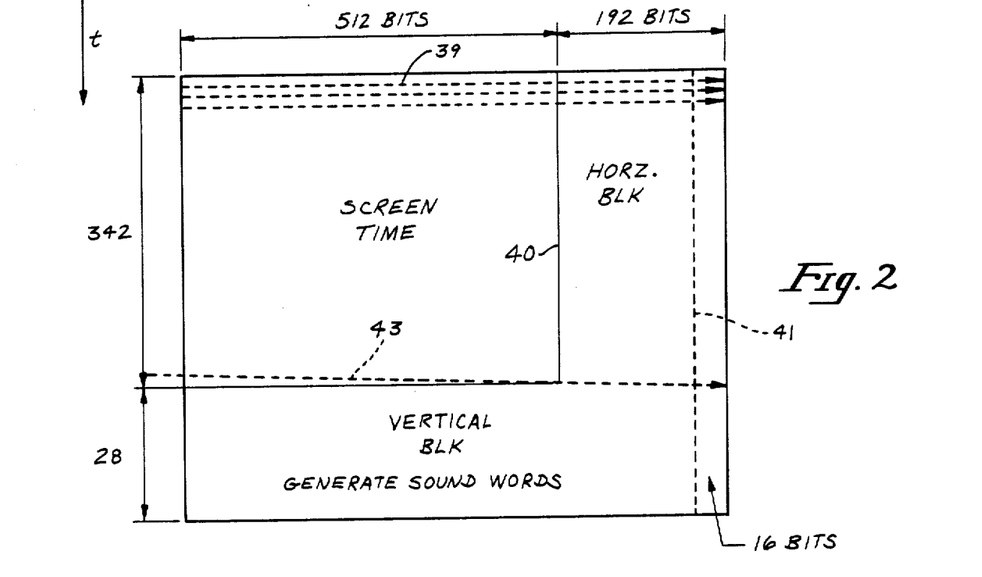
FIG. 2 is a timing diagram used to describe times at which the digital signals representative of sound are accessed from the RAM and times at which they are updated in the RAM.

Referring to FIG. 2, on the display itself there are 512 "live" pixels in the horizontal direction and 342 lines on the screen. The 192 remaining bits during each horizontal scan is the horizontal blanking period sometimes referred to as the "flyback" time. It is during this period of time that the beam current in a cathode ray tube is lowered and the beam brought back from one side of the screen to the other. In the vertical direction, in addition to 342 lines on the display, there are 28 additional periods during which time the vertical blanking occurs, that is, the beam current is again reduced and the beam returned from the lower part of the screen to the upper part of the screen.

In FIG. 2, time is shown from left to right by, for instance, the dotted line 39. On the first scan, after 512 bits have been displayed, the time represented by line 40 is reached, and blanking occurs. During blanking, it is not necessary for the RAM 11 to furnish data for the display. Prior to the time 40, referring to FIG. 1, the count from counter 22 accesses the RAM 11 through the RAM address multiplexer 20. This occurs for each of the lines in the display. (The counter 22 maintains both a horizontal and vertical count.) The counters do not increment in the normal sense during the horizontal blanking period. Rather, four bits of the video counter are reused for counting during this period. This eliminates address gaps for the sound data. When time 40 is reached for each of the scan lines, a timing signal from the PALS 23 causes the multiplexer 20 to accept addresses from the microprocessor 10. During the next 192 counts of the 16 mHz clock, except for the last count, the microprocessor is free to access the RAM and thus can perform tasks unrelated to the display. When the last count in each of the scan lines is reached, a signal from the PALS 23 causes the counter 22 through multiplexer 21 to directly access the memory 11. At this time, the sixteen bit word from RAM 11 (time 41 of FIG. 2) is read from the memory with 8 bits going to the disk motor speed controller 27 and 8 bits to the sound counters 29 (as will be seen, only six bits are used by the disk motor speed controller 27.) During the "screen time" shown in FIG. 2, the sixteen bit words from the memory are placed in the video shift register 28 and used to provide the video signal. The PALS 23, as mentioned, on line 32 provide the horizontal and vertical synchronization signal used in conjunction with the signal from the shift register 28 to control the video display.

When the 342nd scan line is reached (shown as line 43) and at time 40 along this line, the multiplexer 20 again allows the microprocessor 10 to access the RAM 11. However, at the end of line 43 and for the remaining period of the vertical blanking, the multiplexer 21 still forces 9 bits of address into the RAM 11 at time 41 to allow the 16 bit word to be supplied to the speed controller 27 and counters 29. (The lines RA0 to RA6 are time multiplexed to provide these address signals.) During the vertical blanking, the microprocessor 10 is able to access the RAM 11, except for the last count of each line. It is during this period of time as will be described that the disk motor speed control data and sound data stored in the RAM 11 is updated.

The multiplexer 21 with its nine bit address defines contiguous locations in memory, thus allowing all the sound and motor speed data to be more easily accessed and updated by the processor 10. Note that the storage location in the RAM 11 for the sound and speed control data will be in a different location than the screen data.

As currently implemented, during "live" video the microprocessor and video display signal transfers time share the data bus in alternating cycles. During horizontal blanking (for words 32 to 42) the microprocessor alone has access to the data bus. At time 41 of FIG. 2 (43rd word) the microprocessor and sound/speed data transfer time share the data bus in alternate cycles.

It is possible for the microprocessor to update the sound data and speed control data during the live video. The data is, in fact, updated during blanking periods. As currently implemented and preferred, the vertical synchronization signal (retrace signal) initiates the sound data updating. By using this signal and by updating the locations already accessed (e.g., beginning at the location used at line 39, time 41) updating does not interfere with the reading of the sound data. The software program assures that the updating remains ahead of the reading of the sound data. If the microprocessor updates the sound data without being synchronized with the display, data could be replaced before being used. Also this arrangement frees the software from the requirement of being time synchronized with the sound for updating the data.

AUDIO SIGNAL GENERATION

Figure 3:
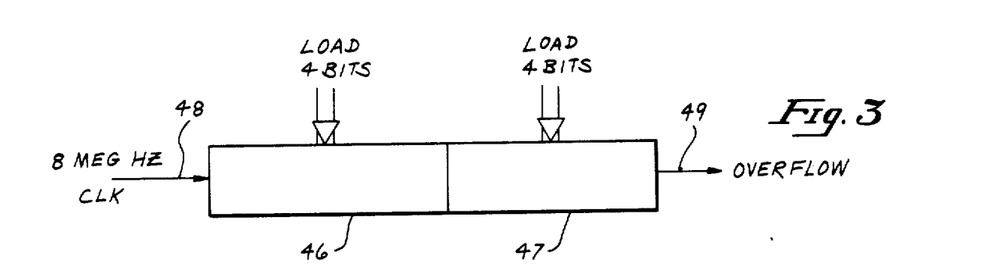
FIG. 3 is a block diagram of a counter used to generate the audio signals.

The eight sound data bits representing the audio signal are shifted in parallel into two four bit counters 46 and 47, shown in FIG. 3. These are commercial counters (Part No. 161). The counters are clocked by the 8 mHz clocking signal on line 48. Counting continues in these counters until overflow which is sensed on line 49. Thus, if all zeroes are placed in the counters, a longer period of time is required until overflow (approximately 32 $\mu$sec.) whereas overflow can occur as soon as one cycle of the 8 mHz clock if all ones are loaded into the counters.

Figure 4:
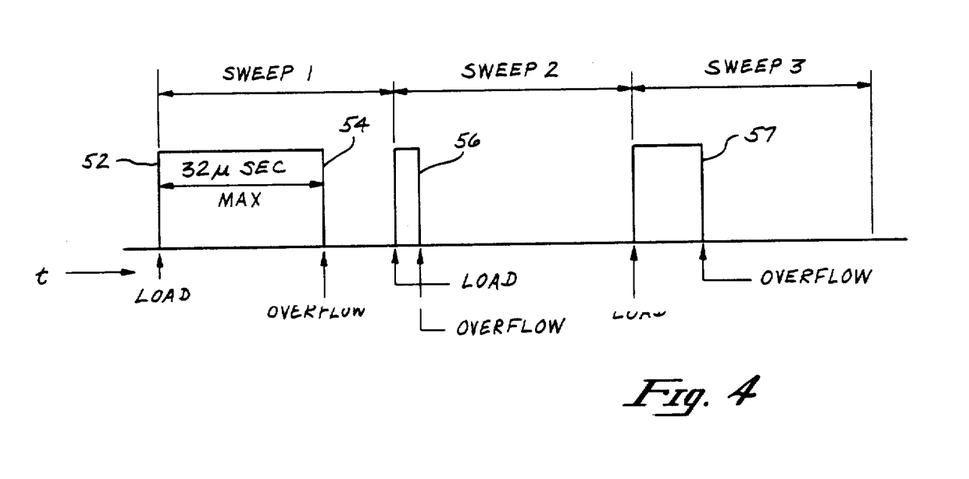
FIG. 4 illustrates waveforms generated from the counter of FIG. 3.

The audio waveform is developed by first generating pulses the widths of which are a function of the time between the loading of the eight bits into the counters 46 and 47 and overflow. For instance, as shown by FIG. 4, the leading edge 52 of a pulse occurs upon loading of sound data into the counters. If all zeroes are loaded, then approximately 32 $\mu$sec. later, overflow occurs and the pulse ends as indicated by the trailing edge 54. One pulse is generated during each horizontal sweep since one eight bit sound data word is loaded into the counters during each sweep. Therefore, pulses are generated at a frequency of approximately 22,000 Hz, and in theory, this provides a bandwidth of approximately 11,000 Hz. In FIG. 4, a second pulse 56 is shown which has a substantially reduced width. This, of course, would occur when a larger number is placed into the counters 46 and 47. The pulse 57, which is shown occurring during a third sweep, has a width which falls between the first and second pulses.

The pulses are integrated using an ordinary integrator to provide the analog signal. The integrator 60 of FIG. 6 receives a load signal and the overflow signal; the waveform 61 shown in FIG. 4 is developed within the integrator 60. Waveform 61 represents the resultant integration of the pulses shown in FIG. 4.

Figure 6:
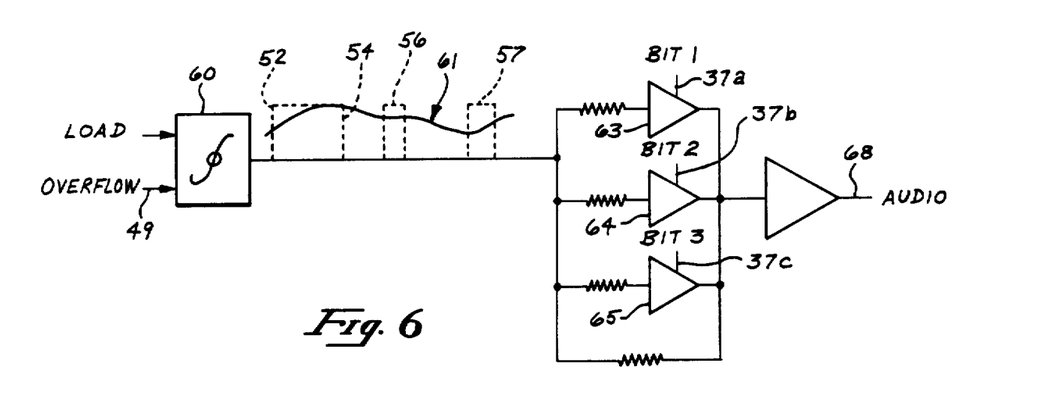
FIG. 6 is a block diagram and schematic of the circuit for providing the audio signal and volume control.

The three bits of information (bits 37a, 37b and 37c) from the interface adapter 55 are used to allow a user to statically control volume. The amplifiers 63, 64 and 65 are switched (on or off) to permit the output amplitude on line 68 to be controlled.

CALCULATION OF THE SOUND DATA SIGNALS

Sound data from the memory which define the sound waveforms are calculated by the microprocessor 10. More specifically, they are "software" generated within the microprocessor. A higher order language, such as PASCAL, may be used to allow a user to more easily implement the flow diagrams which are discussed below. In general, the sound data are produced quite rapidly since the process takes advantage of the rapid adding capability of the 68000 microprocessor.

Figure 5:
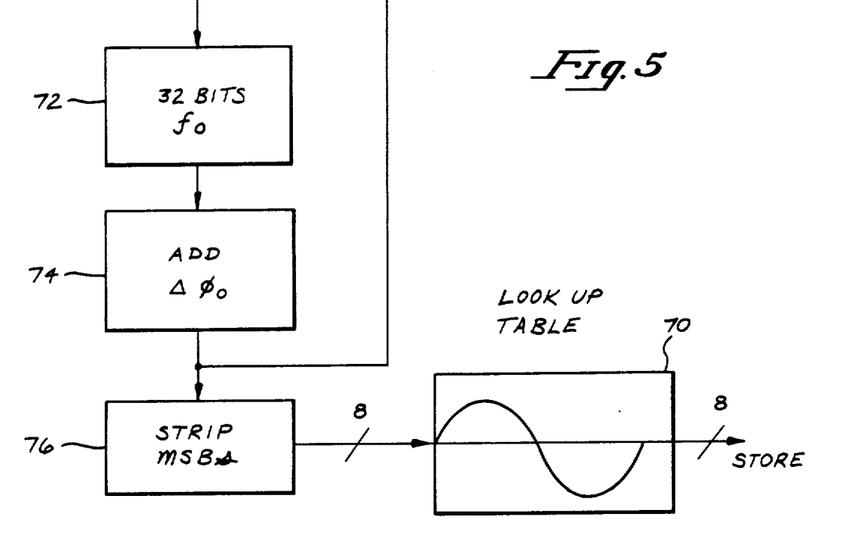
FIG. 5 is a flow diagram used to describe the method by which data signals are produced.

Referring to FIG. 5, assume that a single "pure" tone is to be generated. First, a look-up table is stored within the system memory; in the presently preferred embodiment the look-up table is 256×8 bits. Thus, for each eight bit address to the table an eight bit output results. For a pure tone, the look-up table contains points corresponding to a sinewave. This is illustrated by the look-up table 70 of FIG. 5. The process of generating the address for the subsequent value table is the repeated adding of some predetermined number shown in block 74 as $\phi_0$ to a number stored in register 27. Initially, the 32 bit word stored in register 72 may have any value, for instance, all zeroes. The increment, $\phi_0$ is added to it. The resultant sum is restored in register 72. The most significant eight bits are stripped from the sum as shown by block 76 and used as an address for the look-up table 70.

Assume for sake of discussion that $\Delta\phi_0$ is small. Each time this relatively small binary number is added to the number stored in register 72, the most significant bits will not change, but rather, numerous additions are needed for them to change. Consequently, each of the 256 locations in the look-up table 70 will be addressed several times and the eight bits of data from the look-up table which are stored within the RAM 11 will vary slowly. This, of course, will correspond to a low frequency. If, on the other hand, the increment $\Delta\phi_0$ is relatively large, the results from the look-up table will change more rapidly and thus, for instance, each of the consecutive eight bit data words from the look-up table 70 which are stored in the RAM 11 will be different. This would correspond to a high frequency. A new eight bit sound data word is obtained with each addition represented by block 74. Therefore, by varying the increment added on each cycle, the frequency of the tone is varied. All the sound data used during each frame can easily be calculated during a few scan line periods of the vertical blanking period.

To obtain envelope control or amplitude modulation, a set of tables may be used. Each table, for instance, of a set 0-7, contains a sinewave with maximum peak to peak value of $2^{SET.NO.}$. By allowing a predetermined number of frame intervals to pass before switching between sets, envelope control is achieved.

Figure 7:
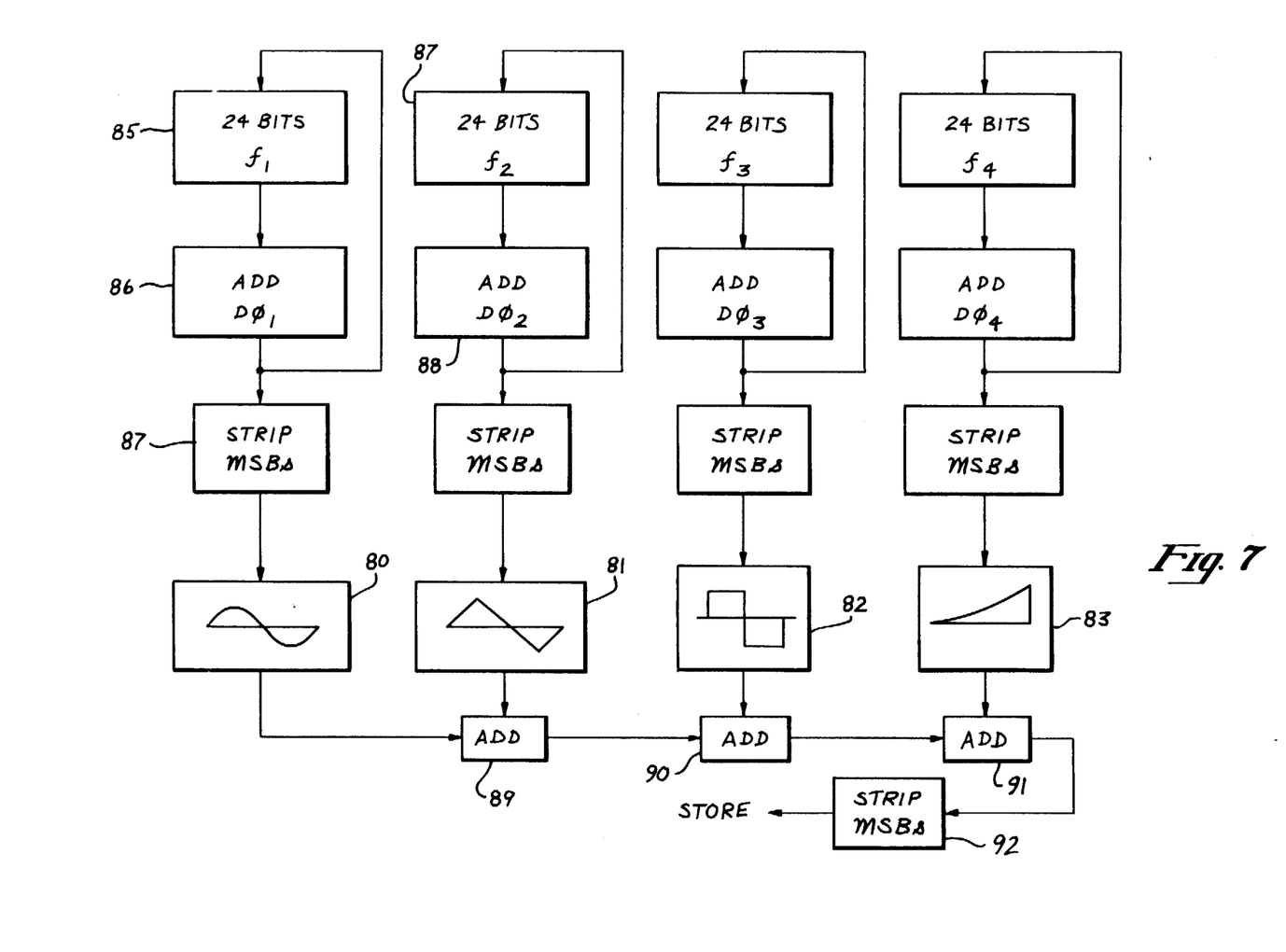
FIG. 7 is a flow diagram illustrating the method by which data signals are provided for four tones.

Referring to FIG. 7, in the presently preferred embodiment, up to four 256×8 look-up tables may be used within the microprocessor 10. And, the contents of each look-up table can be user programmed and each may be different. For instance, look-up table 80 of FIG. 7 is shown as containing a sinewave, table 81 as a triangular wave, table 82 as a square wave, and table 83 as a ramp. The process described in conjunction with FIG. 5 is again used. However, this time (with four simultaneous tones being generated) 24 bits, rather than 32, are used. (This is shown by block 85 in FIG. 7.) Again, an increment shown as $\Delta\phi_1$ is added to the previous sum (block 86). The most significant bits are stripped from the sum (block 87) and used as an address for the corresponding eight bit word within the table 80. The same process is repeated for the number shown within block 87 where a different (or the same) increment $\Delta\phi_2$ is added shown at block 88, and again the most significant bits of the same are used to address look-up table 81. Similarly, different stored values and increments are generated to allow look-ups tables 82 and 83. The resultant eight bits from each of the tables are added as shown by blocks 80, 90 and 91 and the most significant eight bits are stripped from this sum as shown by block 92 and stored within the memory 11. This process is repeated for each of the sound data words stored within the RAM 11 when four tones are generated. Once again, the fundamental frequency for each of the four tones is determined by the increment which is added, such as it blocks 86 and 88, and the harmonic content is determined by the "shape" stored within the look-up table.

Table I, attached, is a program written in 68000 assembly language for implementing the flow diagram of FIG. 7.

With the above-described sound generation apparatus, excellent tone control is achieved with up to 24 bits of "frequency control" being possible (for each tone) within the 11 khz band. This permits almost 17 million different tones to be generated within the band which is approximately equal to (or better) than the best discernability of the human ear.

The above-described processes are particularly suited for providing periodic functions which are harmonic in nature and provide a tonal quality representing music, and the like. For sounds such as voice, an "extended" look-up buffer may be used for initially storing a waveform representative of, for example, speech. This is shown as buffer 93 in FIG. 8. The buffer in fact can be within the RAM 11 and for practical reasons must be if a long waveform is to be stored. The eight bit values are again obtained by adding some increment $\Delta\phi_0$ shown in block 95 to a 32 bit word stored in register 96 with the most significant bits being used to address locations in the buffer 93. The results for the look-up in the extended buffer are stored and selected during the horizontal blanking period as was the case with the case of FIGS. 5 and 7.

Figure 8:
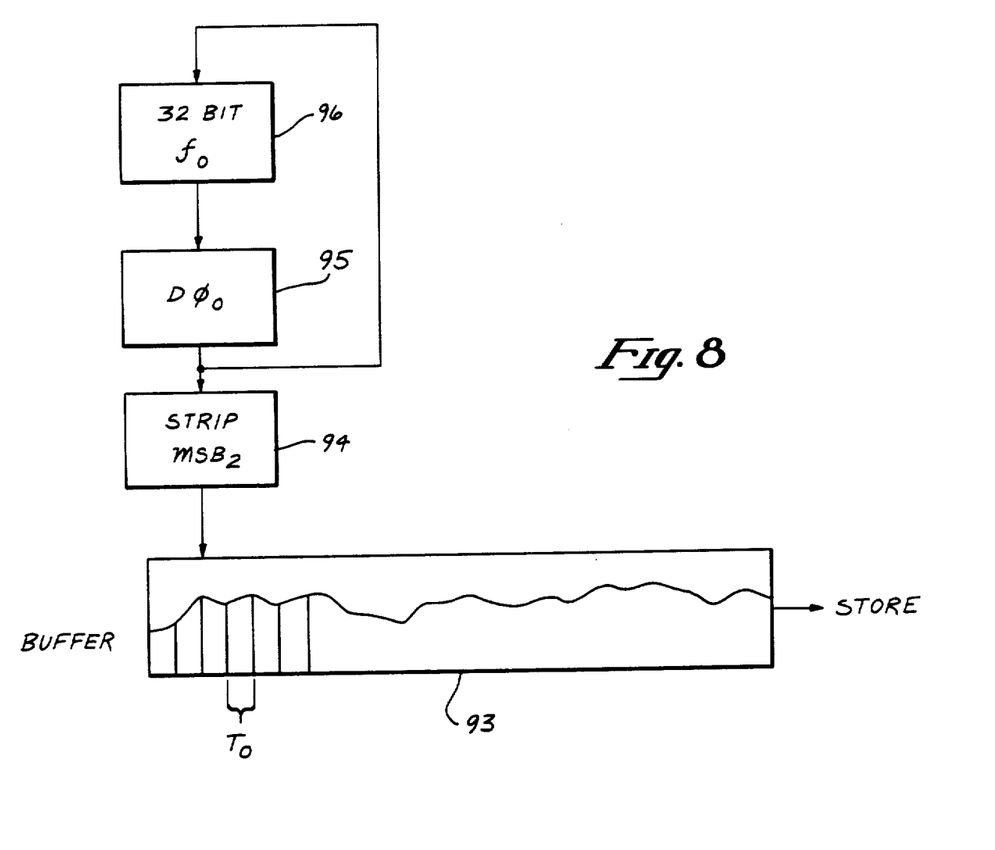
FIG. 8 is a flow diagram illustrating the method by which data signals are generated for a "non harmonic" audio signal.

Table 2, attached, contains a program written in 68000 assembly language for implementing the flow diagram of FIG. 8.

DISK MOTOR SPEED CONTROLLER

Most typically, floppy disk drives and other disk drives, include a mechanism for driving the disk at a constant, predetermined rate of rotation (speed). Upon fabrication of the disk drive, the speed control mechanism is calibrated to assure that data will be recorded and retrieved at a certain rate.

For the present invention the motor speed is controlled by a computer, and moreover, the motor speed is varied as a function of the track being accessed so that uniform flux densities result. That is, the motor turns slower when the outer tracks (greater radius) are being used and faster when the inner tracks (smaller radius) are being used.

Figure 9:
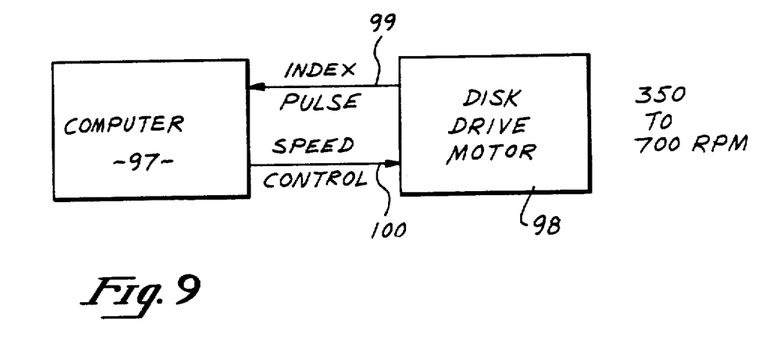
FIG. 9 is a block diagram illustrating the general interconnection between the computer of FIG. 1 and a disk drive motor.

In FIG. 9, the computer of FIG. 1 is shown as computer 97. A disk drive such as a floppy disk drive and in particular, a disk drive motor 98, is also illustrated. Line 99 provides the computer 97 with pulses which indicate the motor speed. In the presently preferred embodiment, the standard indexing pulses from the motor are used. The floppy disk drives employed are keyed to the motor hub, and thus no slippage occurs. Consequently, the index pulses themselves represent the actual rate of rotation of the floppy disk. If slippage is possible, then markers or bit streams from the disk itself may be used to obtain an accurate indication of the disk speed. The speed control signal on line 100 controls the motor speed. A predetermined signal level is used on line 100 and the motor speed sensed on line 99. This allows the computer 97 to record the characteristics of the motor 98. That is, the computer knows for each motor connected to it, the rate of rotation of the motor for a particular speed control signal. In this manner, the disk drive motor 98 itself need not be calibrated when being manufactured, and moreover, the speed control mechanism normally used within the disk drive is not needed since the speed control occurs from the computer 98. As is apparent from FIG. 9, closed loop operation occurs since the computer 97 senses the actual motor speed on line 99.

As currently implemented, the computer 97 examines the pulses 99 and, in effect, determines the characteristics of the motor 98 when a new disk is placed within the disk drive, before data is written or if errors occurred on reading or writing. Obviously, other arrangements may be used, for instance, the indexing pulses can be checked periodically, or for that matter, continually.

In the presently preferred embodiment, the motor operates at a speed from 700 rpms for the innermost track, to 350 rpms for the outer track. Obviously, the selected range of rate of rotation will be a function of the radius of the disk and will vary, depending upon the particular magnetic characteristics of the system and the size of the disk.

As previously mentioned, during each horizontal blanking period, 8 bits of data are provided to the sound counters 29 of FIG. 1, and 8 bits are provided to the speed controller 27. In the presently implementation only six of the bits on this bus are used for speed control. The bus is illustrated as bus 109 in FIG. 10 and these six lines from the bus are shown coupled to six stages of a shift register 102. The six bits from the bus 108 are loaded into the six stages of the register 102 when the sound data signals are loaded into the sound counters 2.

Figure 10:
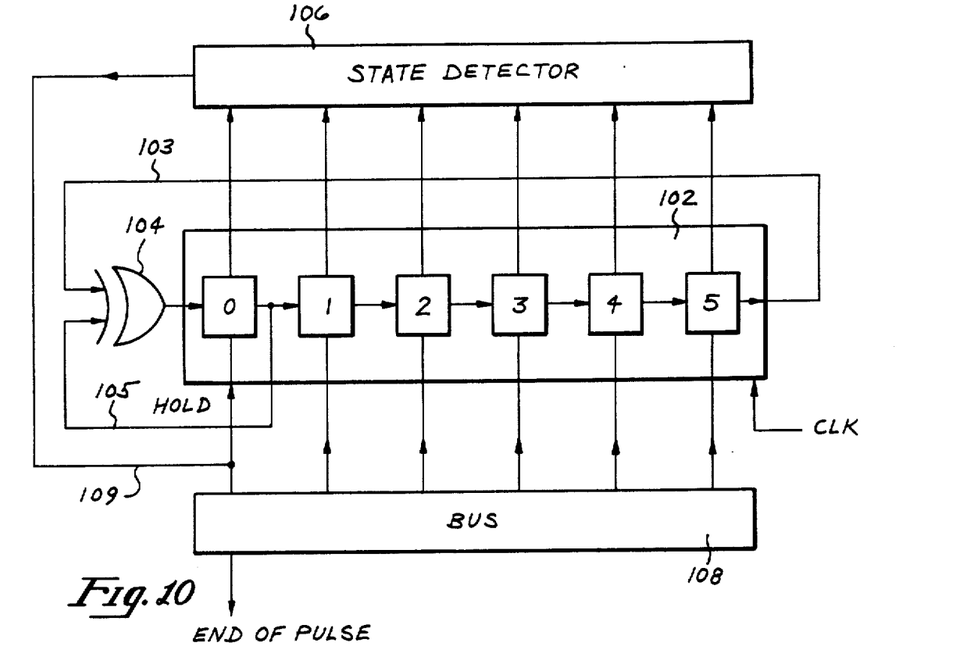
FIG. 10 is a block diagram illustrating part of the circuit used to generate the speed control signal for the disk drive.

FIG. 10 implements a polynomial counter. The data placed into the six stages of the shift register 102 are shifted under the control of a clocking signal. The effective shift rate is approximately 1 mHz. Because of the various waiting stages involved in the shift register, the 8 mHz clocking signal is actually coupled to the register. The output of the last stage of the register is coupled to one input terminal of an exclusive OR gate 104 through line 103. The output of the first stage is coupled to the other input terminal of the gate 104 through line 105. This arrangement provides for counting in the "polynomial generator" in a manner known in the prior art. The stages of the shift register 102 are also coupled to a state detector 106. This detector determines when a predetermined binary state is reached within the shift register. When this state is reached, a signal is coupled over line 109 to stop the shifting within the shift register 102; this signal is used to generate the end of a pulse in the same manner as used for the sound signal.

Figure 11:
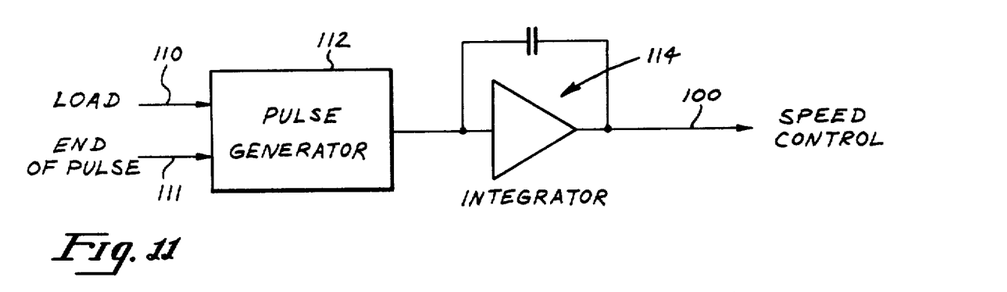
FIG. 11 is a block diagram illustrating an additional portion of the circuit used for generating the speed control signal for the disk drive.

Referring to FIG. 11, counting begins within the shift register 102 of FIG. 10 at the beginning of each horizontal sweep. At this time, the leading edge of a pulse is generated such as edge 115 of the pulse shown in FIG. 12. When the state detector 106 detects the predetermined state, the end of the pulse is generated such as shown by trailing edge 116 of FIG. 12. The pulses are integrated by the integrator 114 and the resultant signal on line 100 is used to control the speed of the motor in an ordinary manner.

The 6 bits placed within the shift register 102 will always reach the state detected by the detector 106 before the end of each horizontal sweep. In practice, the state will be detected during the first 40 μsec. of the approximately 44 μsec. required for each horizontal sweep.

Figure 12:
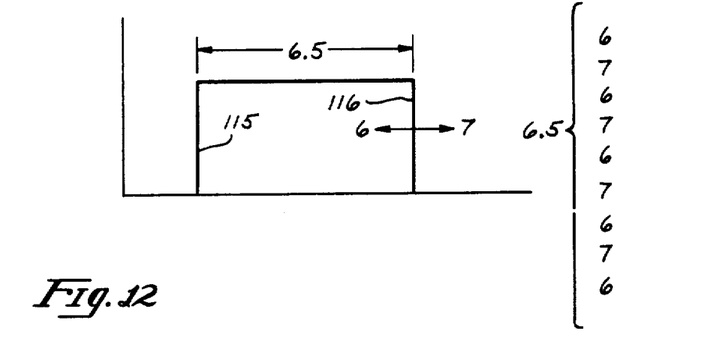
FIG. 12 is a graph illustrating development of the speed control signal.

Ten horizontal sweeps are used for each speed control setting. This is chosen since the presently preferred embodiment employs 370 total scan lines which is evenly distributed by 10. Nonetheless, a pulse is generated for each horizontal sweep. (The time constant associated with the integrator 114 of FIG. 11 is slow enough that a continuous signal results on line 100.) The pulse width generated for each of the 10 sweeps used to define each speed control value is "dithered" to provide precise values. For instance, assume that a value corresponding to 6.5 is required on line 100. Referring to FIG. 12, for the 10 sweeps used to define this value, the first would have the value 6, the second the value 7, and so on for the 10 sweeps. This would cause the trailing edge 116 of the pulses to vary between the values 6 and 7. After being integrated, however, the value on line 100 would correspond to 6.5. By distributing the values and permitting the pulse dithering during the 10 sweeps used to define each speed control number, very accurate control occurs. Control accuracy beyond the 6 bits loaded into the shift register is obtained. In the present realization 400 unique levels or $$\frac{\log(400)}{\log(2)}$$

bits are achieved.

Attached as Table 3, is the program used for the speed control, written in 68000 assembly language.

Thus, an improved apparatus has been described that permits both sound generation and motor speed control in a floppy disk drive, or the like.

TABLE I

```
;
; This code is executed every 16 sec at the vertical retrace
; interrupt. It computes the 370 values for the next sweep.
        MOVEM.L    (A6),D2-D7/A0-A5     ;get sound params into registers
        MOVE.L     SoundBase, A6         ;point to the buffer
        ADD.W      #370,A6               ;actually, point halfway into it
        MOVE.L     #$00FF0000,D1         ;set up mask in high part of D1
        MOVE       #2, -(SP)             ;init outer loop counter
        MOVE       #185,-(SP)            ;loop 185 times (half the buffer)
loop once for half of the 370 values, summing the waveform values for each voice
SoundLoop
        CLR.W      D1                    ;clear out summing register (not the mask
        ADD.L      D2,D3                 ;compute voice 1
        ADD.L      D4,D5                 ;compute voice 2
        ADD.L      D6,D7                 ;compute voice 3
        ADD.L      A0,A1                 ;compute voice 4
;map voice 1 into D1
        MOVE.L     D5,D0
        AND.L      D1,D0                 ;mask off high bits
        SWAP       D0                    ;use bits 16-23
```

TABLE I-continued

| | | |
|---|---|---|
| MOVE.B | 0(A3,D0),D0 | ;lookup in waveform tables |
| ADD.W | D0,D1 | ;add it in |
| ;add voice 3 into D; | | |
| MOVE.L | D7,D0 | |
| AND.L | D1,D0 | ;mask off high bits |
| SWAP | D0 | ;use bits 16-23 |
| MOVE.B | 0(A4,D0),D0 | ;lookup in waveform table |
| ADD.W | D0,D1 | ;add it in |
| ;add voice 4 into D1 | | |
| MOVE.L | A1,D0 | |
| AND.L | D1,D0 | ;mask off high bits |
| SWAP | D0 | ;use bits 16-23 |
| MOVE.B | 0(A5,D0),D0 | ;lookup in waveform table |
| ADD.W | D0,D1 | ;add it in |
| ;update the DMA sound buffer with the new value | | |
| LSR.W | #2,D1 | divide by 4(use most significant bits) |
| MOVE.B | D1,(A6) | ;put it in the buffer |
| ADDQ | #2, A6 | ;bump, buffer pointer |
| ;loop for half the values | | |
| SUBQ | #1,(SP) | ;decrement counter |
| BNE.S | SoundLoop | ;loop till done |
| ;now do the second half of the buffer | | |
| MOVE.L | SoundBase, A6 | ;point to start of buffer |
| MOVE | #185,(SP) | ;reset the counter |
| SUBQ | #1,2(Sp) | ;decrement second counter |
| BNE.S | SoundLoop | ;loop till done |
| ;OK, all done, Update sound table, restore registers and return to caller | | |
| ADDQ | #4,SP | ;pop off loop counter |
| MOVE.L | SoundPtr,A6 | ;get table address |
| ADDQ | #2, A6 | |
| MOVEM.L | D2-D7/A0-A1,(A6) | ;save back the sound registers |
| MOVEM.L | (SP) + ,D0-D7/A0-A6 | ;restore caller's registers |

TABLE 2

| | | |
|---|---|---|
| MOVE.L | SoundBase, A2 | ;get sound base address |
| ADD.W | #64,A2 | ;start 32 bytes in |
| LEA | 676(A2),A4 | ;compute the end address |
| CLR.W | —(SP) | ;flag pass 1 |
| MOVE | #337,D2 | ;338 bytes to move in 1st half |
| ;OK, now that we have everything set up, start the main loop to fill the buffer | | |
| MOVE.B | (A1),(A2) | ;move it into the DMA buffer |
| ADDQ | #2,A2 | ;bump to next location |

TABLE 2-continued

| | | |
|---|---|---|
| ADD.L | D1,D3 | ;bump cumulative index |
| SWAP | D3 | ;get high part in low territory |
| ADD.W | D3,A1 | ;bump to next entry (maybe) |
| ADD.W | D3,D0 | ;accumulative numDone |
| CLR.W | D3 | ;reset integer part |
| SWAP | D3 | ;restore D3 |
| ;have we exhausted our request? | | |
| CMP.L | A1,A3 | ;past the end of the buffer? |
| DBLE | D2,Interpolate | ;if so, stop it |

TABLE 3

| | | |
|---|---|---|
| ;Routine: | SetSpeed, SetASpeed | |
| ;Arguments: | D6.W (input) -- track number speed should be set for | |
| ; | Drive (input) -- current disk drive | |
| ; | TrkSpeedTbl (in) -- speed code table for current drive | |
| ; | Wait (output) -- 0, or SpdChgTime if CurSpeed changed | |
| ; | registers other than A0-A2, D0-D2 are preserved | |
| ;Called By: | (SetSpeed): Seek,RWPower | |
| ; | (SetASpeed): MakeSpdTbl | |
| ;Function: | This routine determines the correct speed value | |
| ; | for Track and sets up the PWM memory buffer to | |
| ; | produce the desired output. The value of Wait is | |
| ; | set to SpdChgTime if the speed is changed. 0 | |
| ; | otherwise. The TrkSpeedTbl for the current drive | |
| ; | is used. The drive enable is not changed, just the | |
| ; | PWM buffer in memory. | |
| ; | SetASpeed is an alternate entry point which simply | |
| ; | sets the pwm buffer according to a speed code in D2. | |
| Set Speed | | |
| BSR.S | GetDrvl | ; set up D1.A1 |
| MOVE.W | D6,D2 | ; speed class is just track number |
| LSR.W | #4,D2 | ; divided by 16 . . . |
| LSL.W | #3,D2 | ; adjust to double-longword word index |
| ADD.W | D1,D2 | ; add drive specific offset |
| MOVE.W | TrkSpeedTbl(A1,D2),D2 | ; get the speed we need |
| ADD.W | OffSpeed(A1,D1),2 | ; add in an adjustment (watch max,min) |
| BSL.S | @2 | ; don't go below 0 |
| MOVEQ | #0,D2 | |
| @2 CMP.W | #399,D2 | |
| BLE.S | @3 | |
| MOVE.W | #399,D2 | ; don't go above 399 |

TABLE 3-continued

|  | MOVE.W | PWMValue,D0 | ; are we at that speed? |
|---|---|---|---|
| @3 | BPL.S | @4 | ; if speed is invalid, wait power-on |
| time |  |  |  |
|  | MOVE.W | PwrOnTime(A1),D0 |  |
|  | BRA.S | @6 |  |
| @4 | SUB.W | D2,D0 |  |
|  | BEQ.S | GetDrv1 | ; if so, just exit |
|  | BPL.S | @5 |  |
|  | NEG.W | D0 | ; positive speed difference |
| @5 | LSL.W | #5,D0 | ; multiply by 32 to get speed settle |
| time |  |  |  |
|  | CMP.W | SpdChgTime(A1),D0 | ; minimum wait time for speed change |
|  | BGT.S | @6 |  |
|  | MOVE.W | SpdChgTime(A1),D) |  |
| @6 | ADD.W | Wait(A1),D0 | ; add in current wait time |
|  | CMP.W | PwrOnTime(A1),D0 |  |
|  | BLT.S | @7 |  |
|  | MOVE.W | PwrOnTime(A1),D0 |  |
| @7 | MOVE.W | D0,Wait(A1) |  |

;SetASpeed is an alternate entry point which simply sets up the speed code in D2

| SetASpeed |  |  |  |
|---|---|---|---|
|  | MOVE.W | D2,PWMValue | ; note the speed for future reference |
|  | MOVEM.L | D3-D6/A2,−(SP) | ; preserve A2-A7 D3-D7 |
|  | SUB.W | #399,D2 | ; invert it (for sony) |
|  | NEG.W | D2 |  |
|  | EXT.L | D2 | ; make it a long . . . |
|  | DIVU | #10,D2 | ; remainder in high word |
|  | MOVEQ | #11, D0 |  |
| @1 | MOVE.B | D0,D1 | ; main speed value |
|  | MOVE.B | D0,D3 | ; save bit 0 |
|  | LSR.B | #1, D0 |  |
|  | EOR.B | D0,D3 |  |
|  | LSR.B | #1, D3 | ; new bit 5 −>cy |
|  | BCC.S | @2 |  |
|  | BSET | #5, D0 |  |
|  | DBRA | D2,@1 |  |
|  | SWAP | D2 | ; remainder determines dither |
|  | MOVE.B | DitherTbl(D2),D5 | ; need 10 bits from dither table |
|  | ASL | #8,D5 |  |
|  | MOVE.B | DitherTbl + 1(D2),D5 | ; get 2 bits from next one |
| LoadPWMBuf |  |  |  |
|  | MOVEQ | #36,D3 | ; big loop goes 37 times |
|  | LEA | PWMBuffer,A0 | ; fill up PWM buffer |
|  |  |  | (37 × 10 = 370 bytes) |
|  | MOVE.L | PWMBuf2,A2 | ; in case of alternate buffer |
| @1 | MOVE.Q | #9,D2 | ; inner loop goes 10 times |
|  | MOVE.W | D5,D4 | ; dither pattern |
| @2 | LSL.W | #1,D4 | ; carry bit = 1 means use higher value |
|  | BCC.S | @3 |  |
|  | MOVE.B | D0,D6 | ; use higher value |
|  | BRA.S | @4 |  |
| @3 | MOVE.B | D1,D6 | ; use main value |
| @4 | MOVE.B | D6,(A2) |  |
|  | ADDQ | #2,A0 | ; every other byte is sound stuff |
|  | ADDQ | #2,A2 |  |
|  | DBRA | D2,@2 |  |
|  | DBRA | D3,@1 |  |
|  | MOVEM.L | (SP) + ,D3-D6/A2 | ; observe reg save conventions |
| SetSpdExit | BRA | GetDrv 1 |  |
| DitherTbl |  |  | ; used to dither the speed values evenly |
| .Byte | $00,$20,$21,$24,$94 |  |  |
| .Byte | $AA,$B5,$B7,$7B,$FF,$40,$00 |  |  |

We claim:

1. In a computer system which includes a microprocessor and a random-access memory (RAM) and which provides a video signal for a raster scanned display, wherein said microprocessor accesses said RAM for loading data and said data is read from said RAM for presentation to said raster scanned display, an apparatus for generating an analog audio signal comprising:

a first counter for providing a digital count representative of timing of said video signal for said display, said first counter providing a vertical line count and a horizontal bit count for each frame of said display;

first address multiplexing means coupled to said first counter, microprocessor and said RAM for coupling either an address signal from said microprocessor or said digital count from said first counter to access a location of said RAM;

second address multiplexing means coupled to said first counter and said RAM, for coupling a portion of said digital count from said first counter to access said RAM by direct memory access;

said portion of said digital count coupled by said second address multiplexing means accesses audio data stored in said RAM, at least during a portion of the horizontal blanking period of said video signal, said audio data being programmed by said microprocessor and stored in said RAM;

said first address multiplexing means for coupling said digital count from said first counter as an address to said RAM during a video display cycle to access video data stored in said RAM and for coupling address signals from said microprocessor to said RAM at least during portions of the vertical blanking period to update said audio data in said RAM;

waveform means coupled to receive said stored audio data from said RAM during said portion of said horizontal blanking period and for converting said audio data to said analog audio signal; said waveforms means further having a second counter into which said audio data is loaded from said RAM, said second counter counting at a predetermined rate after said audio data is loaded; and said waveform means further including pulse generation means coupled to said second counter for initiating a pulse when said second counter is loaded and for ending said pulse when said second counter reaches a predetermined count, such that a frequency of said audio signal is determined by a programmed value of said audio data.

2. The apparatus defined by claim 1 wherein ending of said pulse occurs when said second counter overflows.

3. The apparatus defined by claim 2 including integration means for integrating said pulses from said pulse generation means.

4. The apparatus defined by claim 1 or 3 wherein said horizontal blanking means occurs at a frequency of approximately 22,000 Hz.

5. The apparatus defined by claim 4 wherein said vertical blanking occurs at a frequency of approximately 60 Hz.

6. The apparatus defined by claim 1 including an additional waveform means for converting data from said RAM, addressed during said horizontal blanking period by said first counter, to a speed control signal for a disk drive.

7. In a computer system which includes a microprocessor and a random-access memory (RAM) and which provides a video signal for a raster scanned display, a method for generating an analog audio signal from digital data signals which are stored in said RAM by said microprocessor, comprising the steps of:

generating digital data signals under control of said microprocessor by storing a base number, adding a predetermined number to said base number, using the most significant bits as a location in a lookup table, storing the sum as said base number, and using a value stored at said location accessed by the most significant bits as output for storage in said RAM;

storing said digital data signals in said RAM;

generating address signals from a first counter;

accessing said RAM by using said address signals from said first counter during a video display cycle to access video data stored in said RAM;

accessing said RAM by using said address signals from said first counter during portions of horizontal blanking periods by direct memory access to obtain said stored digital data signals representative of said audio signal;

converting said digital data signals into said analog audio signal by generating a pulse which pulse-width is dependent on the value of said digital data signal and integrating said pulse to generate waveforms for said analog audio signal;

loading said RAM with new digital data signals representative of new audio signals during vertical blanking periods, wherein said microprocessor accesses said RAM for loading of said new digital data signals.

8. In a computer system which includes a microprocessor and a random-access memory (RAM) and which provides a video signal for a raster scanned display, wherein said microprocessor accesses said RAM for loading data and said data is read from said RAM for presentation to said raster scanned display, an apparatus for generating a speed control signal for a disk drive comprising:

a first counter for providing a digital count representative of timing of said video signal for said display, said first counter providing a vertical line count and a horizontal bit count for each frame of said display;

first address multiplexing means coupled to said microprocessor, RAM and said first counter for coupling either an address signal from said microprocessor or said digital count from said first counter to access a location of said RAM;

second address multiplexing means coupled to said first counter and said RAM, for coupling a portion of said digital count from said first counter to access said RAM by direct memory access;

said portion of said digital count coupled by said second address multiplexing means accesses disk speed data stored in said RAM, at least during a portion of the horizontal blanking period of said video signal;

said first address multiplexing means for coupling said digital count from said first counter as an address to said RAM during a video display cycle to access video data stored in said RAM and for coupling address signals from said microprocessor to said RAM at least during portions of the vertical blanking period to update said disk speed data in said RAM;

waveform means for receiving said stored disk speed data from said locations and for converting said disk speed data to said speed control signal; said waveform means having a second counter into which said disk speed data is loaded from said locations of said RAM, said second counter counting at a predetermined rate after said data is loaded; and said waveform means further including pulse generation means coupled to said second counter for initiating a pulse when said second counter begins counting and for ending said pulse when said second counter reaches a predetermined count, said pulse generation means coupled to said second counter.

9. The apparatus defined by claim 8 including integration means for integrating said pulses from said pulse generation means.

10. The apparatus defined by claim 8 wherein said computer system senses disk drive speed and varies said control signal as a function of said speed to provide dynamic calibration.

11. The apparatus defined by claims 8 or 10 wherein said speed control signal is varied as a function of the track being accessed on a disk.

* * * * *